United States Patent
Kral et al.

(10) Patent No.: US 7,739,217 B2
(45) Date of Patent: Jun. 15, 2010

(54) MONITORING POLYETHYLENE POLYMERIZATION SYSTEM UTILIZING THE METHOD FOR MESSAGE SUPPRESSION IN RULE BASED EXPERT SYSTEM

(75) Inventors: Bohumil Vaclav Kral, Beaumont, TX (US); David Jack Sandell, Beaumont, TX (US)

(73) Assignee: ExxonMobil Chemical Patents Inc., Houston, TX (US)

(*) Notice: Subject to any disclaimer, the term of this patent is extended or adjusted under 35 U.S.C. 154(b) by 0 days.

(21) Appl. No.: 12/549,755

(22) Filed: Aug. 28, 2009

(65) Prior Publication Data

US 2009/0319464 A1   Dec. 24, 2009

Related U.S. Application Data

(63) Continuation of application No. 11/644,227, filed on Dec. 22, 2006, now abandoned.

(51) Int. Cl.
 G06F 15/18 (2006.01)
 C08F 2/00 (2006.01)
 G05D 23/00 (2006.01)
 G05D 7/00 (2006.01)
 B01J 8/18 (2006.01)

(52) U.S. Cl. .............. 706/47; 706/11; 706/12; 706/60; 526/64; 526/113; 526/901; 526/905; 422/109; 422/110; 422/113; 422/138; 422/139

(58) Field of Classification Search .............. 706/11, 706/12, 47; 526/64, 113, 901, 905; 422/109, 422/110, 113, 138, 139
See application file for complete search history.

(56) References Cited

U.S. PATENT DOCUMENTS

| | | | |
|---|---|---|---|
| 4,754,409 A | 6/1988 | Ashford et al. |
| 5,081,598 A | 1/1992 | Bellows et al. |
| 5,905,989 A | 5/1999 | Biggs |
| 6,012,152 A | 1/2000 | Douik et al. |
| 6,127,944 A | 10/2000 | Daly et al. |
| 6,473,896 B1 | 10/2002 | Hicken et al. |
| 6,564,196 B1 | 5/2003 | Masuoka |
| 6,728,692 B1 | 4/2004 | Martinka et al. |

FOREIGN PATENT DOCUMENTS

| | | |
|---|---|---|
| EP | 0397 992 | 11/1990 |
| GB | 2 207 531 | 2/1989 |

*Primary Examiner*—Donald Sparks
*Assistant Examiner*—Ola Olude Afolabi (57) ABSTRACT

One exemplary method for message suppression comprises: providing first and second rules, each having one or more preconditions and a conclusion, wherein the first rule also has a suppressed-by attribute and at least one of the second preconditions is suppressing; evaluating the one or more first and second preconditions; identifying the first rule as true or false; displaying the message of the second rule if all of the second preconditions are met; identifying the first rule as suppressed if the second rule is named in the suppressed-by attribute; and inhibiting the message display of the suppressed rule or routing the message to second display. The system can comprise: a database containing knowledge of the production unit; a user interface, and at least one precondition, a suppressed by attribute, and one or more rules each having a conclusion and at least one suppressing precondition; an inference engine; and a display.

25 Claims, 9 Drawing Sheets

| AND | SIMPLE | ▶ | 07-T17015 | ▶ | 07-T17015 | > | ▶ | 85 |
|---|---|---|---|---|---|---|---|---|
| AND | RULE | ▶ | 44 BED LEVEL AND FBD CHECK | | | IS | ▶ | TRUE |
| AND | FUNCTION | ▶ | 07-T17015 | ▶ | 07-T17015 | > | ▶ | 85 |

FIG. 4

| AND | NO SHOW RULE | ▶ | 44 BED LEVEL AND FBD CHECK | IS | ▶ | NOT TESTED |
|---|---|---|---|---|---|---|
| AND | NO SHOW MSSG | ▶ | 44 BED LEVEL CHECK MESSAGE | IS | ▶ | TRUE |

MONITORING POLYETHYLENE POLYMERIZATION SYSTEM UTILIZING THE METHOD FOR MESSAGE SUPPRESSION IN RULE BASED EXPERT SYSTEM

CROSS REFERENCE TO RELATED APPLICATIONS

This application is a continuation of and claims priority and benefit of U.S. application Ser. No. 11/644,227, filed Dec. 22, 2006, now abandoned, the disclosure of which is fully incorporated herein by reference.

BACKGROUND OF THE INVENTION

1. Field of the Invention

Embodiments of the present invention generally relate to methods for message suppression in rule based expert system. More particularly, embodiments of the present invention generally relate to a method for message suppression in rule based expert systems for process operations.

2. Description of the Related Art

Expert systems are computerized tools designed to enhance the quality and availability of knowledge required by decision makers in a wide range of industries. Expert systems augment conventional programs such as databases, word processors, and spreadsheet analysis. Typically, a model based expert system is based on fundamental knowledge of the design and function of an object, whereas a rule-based expert system is based on a set of rules that a human expert would follow in diagnosing a problem.

Rule-based expert systems generally contain two components: (1) a working memory which represents knowledge of the current state of the system being monitored; and (2) a rule base which contains expert knowledge in the form of "condition-action" rules, also known as "if-then" rules. The condition part of each rule determines whether the rule can be applied based on the current state of the working memory. For example, the condition part of each rule can contain relations that are applied to objects or groups of object slots or tests. Within the object slots math expressions and arithmetic relations can be used, such as greater than (>), less than (<), equal to (=), greater than or equal to (>=), less than or equal to (<=), and not equal to (/=).

The action part of a rule contains executable commands. In other words, the condition part of each rule determines whether (or "if") the rule can be applied based on the current state of the working memory; and the action part of a rule contains a conclusion ("then") which can be drawn from the rule when the condition is satisfied. A rule either recognizes some event or combination of events, or performs some correlation management function. Thus, a rule may assert, resolve, or close some other correlations. Creating a correlation may invoke some defined function or script or send a notification to external systems.

An expert system can have an inference engine that evaluates the rules. During rule evaluation, the inference engine evaluates all necessary preconditions leading to a rule. In the case of conjunctive preconditions, the inference engine concludes a rule to be "TRUE" when all the preconditions of the rule have been satisfied or met. More than one rule can lead to the same conclusion. Usually the rules leading to the same conclusion are disjunctive, connected by a logical OR expression for conclusion evaluation. As long as at least one rule leading to a conclusion is true, then the inference engine will set the conclusion to be TRUE. Otherwise, the conclusion will be set to be FALSE.

In practice, when an object (rule, precondition, or conclusion) is considered true it means that the attribute named "status" of that object is set to logical TRUE. A change of a rule's status or a conclusion's status to TRUE can trigger a display of a text message. Since more than one rule can lead to a conclusion it is advantageous to combine rule text (its name or its text attribute) and conclusion text (its name or its text attribute) into one message, for instance in a form "rule text: conclusion text" making it clear which rule firing caused the message display.

In the case of embedded rules, when a first rule has to be TRUE in order for a second rule to be TRUE and so on and so forth, the display of superfluous messages can occur. This occurrence is also known as message overload. The message overload is not limited to embedded rules, it can occur anytime when a message identifying the root cause of a problem is identified but related messages of lower importance flood the display.

Message overload is a concern of expert systems because messages of high importance are embedded amongst messages of lower importance although also TRUE. For example, a first rule detects a small problem which may not require any action and a second rule detects a bigger related problem that requires immediate attention. If both rules cause a display of a corresponding message, the first rule's conclusion is superfluous or redundant to the second rule's conclusion. If several of these kinds of superfluous messages are displayed simultaneously, the output of the system is compromised because an operator of the expert system can not readily determine a priority of the many messages displayed.

One approach to solving the message overload problem includes rule nesting. In rule nesting, the second rule is added as a FALSE precondition of the first rule, preventing the first rule from sending a displayed message when the second rule becomes TRUE. The disadvantage of such an arrangement is that the first rule is forced to an incorrect FALSE status, when in fact, the first rule would be TRUE without the nested precondition. If some other rule or rules depend on the first rule, that induced error propagates throughout the expert system. In a large expert system, the induced errors can compromise the integrity (i.e. correctness) of the system. Further, there may be a brief nuisance period, such as several minutes, after the second rule evaluates TRUE during which both messages are displayed until the inference engine re-evaluates the first rule.

Another approach to solving the message overload problem involves the classification of messages. In a message classification system, messages are assigned a priority, a different display destination, or a similar attribute. The disadvantage with this approach is that the message classification is permanent. Once a message is classified during the creation of the rule, the message is directed to secondary screens, log files, or reports which are less monitored. As a result, these classified or re-directed messages can be overlooked, and although the messages may not be a high priority, they still provide valuable information which could be missed. In other words, when the priority designation is assigned during rule creation, the priority of the rule will not change during rule evaluation and lower priority messages will never be displayed on a primary console. Another method, sorting the messages by priority with low priority messages forced to the bottom of the display, has the same disadvantages.

There is a need, therefore, for a method to suppress redundant or superfluous messages without changing the truthfulness and/or nature of a rule and without permanently directing the messages to a secondary display which are often overlooked or not monitored.

SUMMARY OF THE INVENTION

A method for message suppression and an expert system for operating a production unit are provided. In at least one embodiment, a method for message suppression comprises: providing a first rule having one or more preconditions, a suppressed-by attribute, and a conclusion; providing a second rule having one or more preconditions and a conclusion, wherein at least one of the one or more preconditions is a suppressing precondition; evaluating the one or more preconditions of the first rule and the second rule; displaying the message associated with the second rule if all of the one or more preconditions of the second rule are met; identifying the second rule in the suppressed by attribute of Rule 1 if all of the one or more preconditions of the second rule are met; identifying the first rule as a suppressed rule if second rule is identified in the suppressed-by attribute of the first rule; identifying the second rule as a non-suppressed rule and inhibiting the display of the message associated with the suppressed rule or routing it to a second display.

In yet another embodiment, the method comprises providing a first rule having one or more preconditions, and a conclusion CCL-1 having a suppressed-by attribute; providing a second rule having one or more preconditions and a conclusion, wherein at least one of the one or more preconditions is a suppressing precondition; evaluating the one or more preconditions of the first rule and the second rule; displaying the message associated with the second rule if all of the one or more preconditions of the second rule are met; identifying the second rule in the suppressed by attribute of conclusion CCL-1 if all of the one or more preconditions of the second rule are met; identifying the conclusion CCL-1 as a suppressed conclusion if the second rule is identified in the suppressed-by attribute of the conclusion CCL-1; identifying the second rule as a non-suppressed rule and inhibiting the display of the message associated with the suppressed conclusion CCL-1 or routing it to a second display.

In yet another embodiment, the method comprises providing at least one suppressed rule having one or more preconditions, a "suppressed by" attribute, and a conclusion; providing at least one non-suppressed rule having one or more preconditions and a conclusion; evaluating the one or more preconditions of the rules to determine a status of the rules as true or false; and displaying the conclusion of the non-suppressed rule, if determined true, on a first display without changing the status of the suppressed rule.

In at least one embodiment, the system comprises: a database containing knowledge of a production unit; a user interface to provide one or more rules each having at least one precondition, a "suppressed by" attribute, and a non-suppressed conclusion, and one or more rules each having at least one suppressing precondition and suppressing conclusion; an inference engine to evaluate the one or more preconditions of the rules; and a display to show the suppressing rule and the suppressed by attribute.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF THE INVENTION

A detailed description will now be provided. Each of the appended claims defines a separate invention, which for infringement purposes is recognized as including equivalents to the various elements or limitations specified in the claims. Depending on the context, all references below to the "invention" may in some cases refer to certain specific embodiments only. In other cases it will be recognized that references to the "invention" will refer to subject matter recited in one or more, but not necessarily all, of the claims. Each of the inventions will now be described in greater detail below, including specific embodiments, versions and examples, but the inventions are not limited to these embodiments, versions or examples, which are included to enable a person having ordinary skill in the art to make and use the inventions, when the information in this patent is combined with available information and technology.

In at least one embodiment, a method, apparatus and system are provided that will dynamically suppress messages from an expert system based on other events and process knowledge while avoiding rule nesting or message classification. In at least one other embodiment, the method, apparatus and system provided will also trace a disabling process by identifying the rule causing the disabling action.

The term "suppress" as used herein refers to the exclusion or inhibition of a message from a display screen, report, log file or other destination. The suppression of a message does not have to discard a message. In at least one specific embodiment, the suppression of a message can change the destination of a message to a different screen, report, log file or other destination (i.e., re-routed).

The messages are included or suppressed from display based on the content of a "suppressed-by" attribute. As such, messages can be re-routed, excluded or eliminated without affecting the expert system. Therefore, the logical correctness and other features of the expert system are not compromised. More importantly, the method, apparatus and system provided herein does not alter the preconditions, rules, and conclusion status evaluation by an expert system inference engine. Instead, a secondary "suppression" inference engine (SIE) is added to evaluate if and when a message should be suppressed.

A preferred expert system is built in an object oriented programming environment that allows the expert system objects, such as rules, premise clauses and conclusion clauses, to have attributes. Attributes store the knowledge about the expert system objects. An illustrative set of attributes of the rule object can include a rule name, rationale or reason for the rule, rule text, related equipment, rule status (e.g., TRUE or FALSE), and evaluation time. An illustrative set of attributes of the premise clause (i.e., "precondition") can include precondition ID, ID of parent rule, operator-formula to evaluate, validated as TRUE or FALSE based on syntactical validity of the operator, input quality (e.g., good or bad depending on quality of input data), and status as TRUE or FALSE. An illustrative set of attributes of the conclusion clause (i.e., "conclusion") can include conclusion name, priority, message text, destination for the message, and status as TRUE or FALSE. Any of the above sets of attributes can further include a "suppressed by" attribute, which signals that a rule or conclusion may be TRUE but is suppressed by another rule. In practice, the "suppressed by" attribute is populated by names of rules causing the suppression which inhibits message display based on the content of this attribute, as explained in more detail below.

Figure 1:
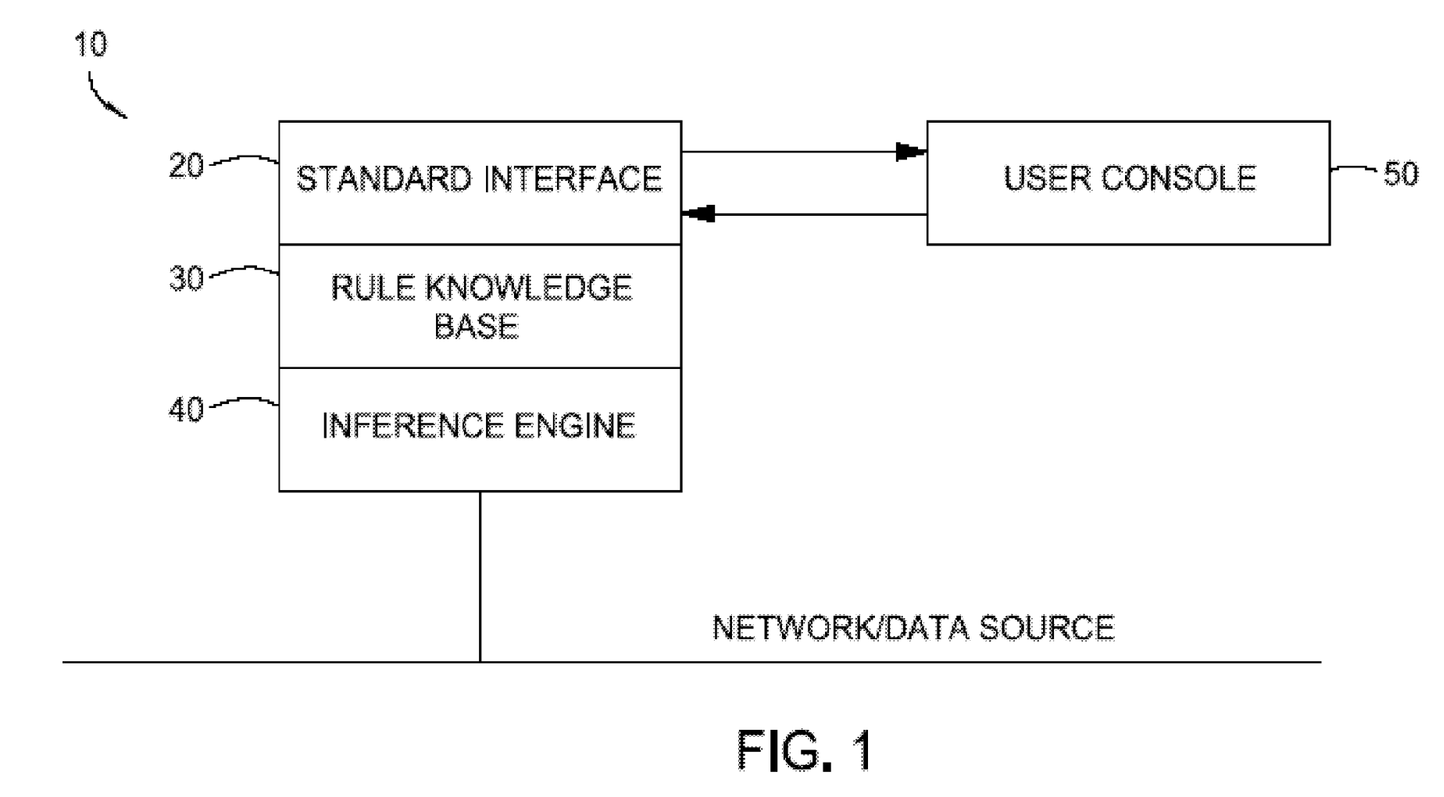
FIG. 1 is a block diagram of an illustrative expert system.

FIG. 1 is a block diagram of an illustrative expert system 10 capable of processing the attributes described. As shown in FIG. 1, the expert system 10 includes a standard interface 20 in communication with a knowledge base 30 ("database") and inference engine 40. The standard interface 20 is also in communication with a user console 50. As described above, the inference engine 40 evaluates one or more rules. The inference engine 40 evaluates all necessary preconditions leading to a rule. Once the rule is evaluated, the conclusion of the rule is evaluated and a display is triggered, the message can be displayed on the user console 50. Records about the system, whether inputted by a user, expert engineer, or acquired through process operations, are kept in the knowledge base 30.

Figure 2A:
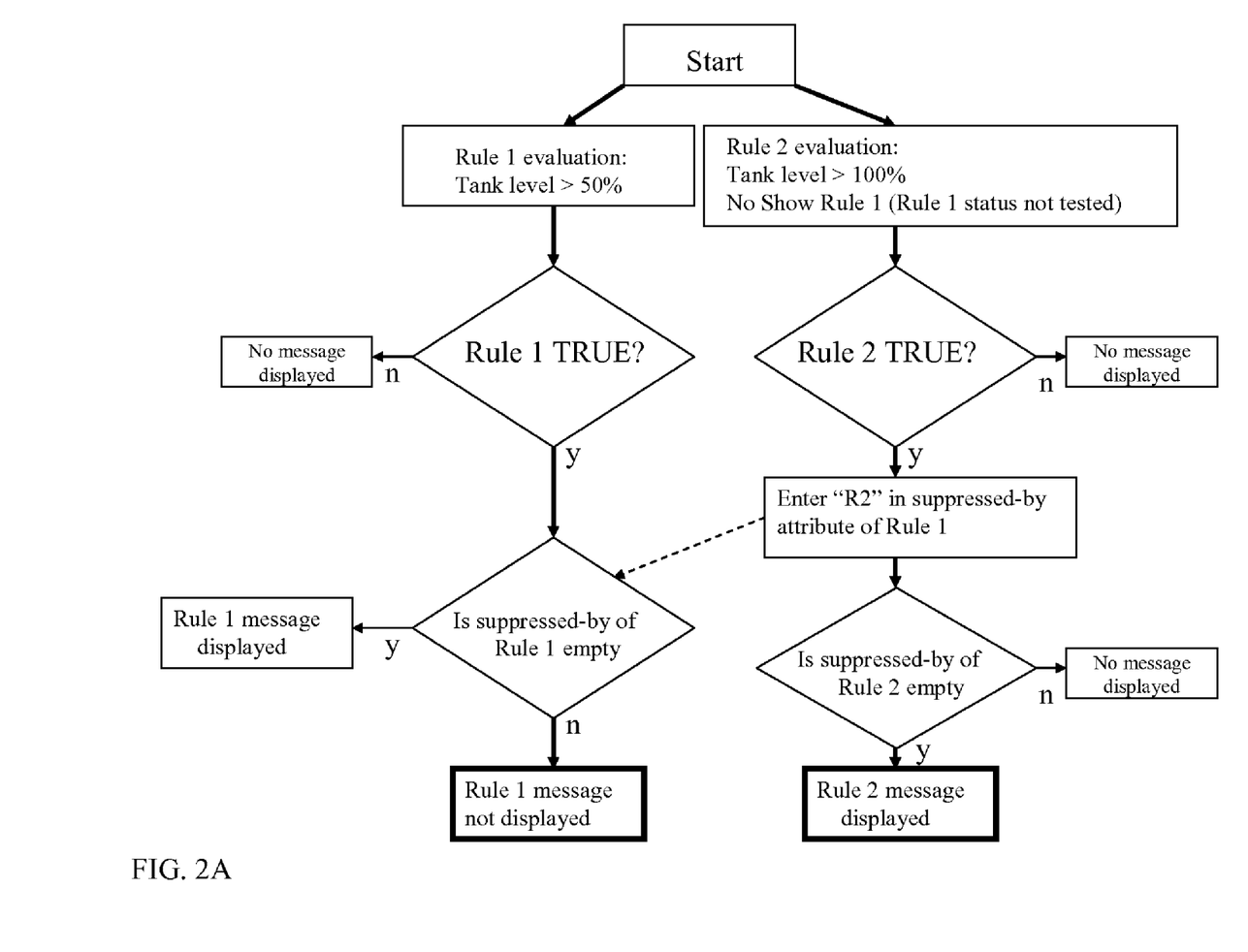
FIG. 2A is a logic flowchart showing an illustrative embodiment of a method for non-conditional rule suppression.

FIG. 2A is a logic flowchart showing one method for rule suppression according to embodiments herein. Such a method is an example of a non-conditional rule suppression method wherein Rule 2 is to suppress Rule 1. As shown in FIG. 2A, a precondition of Rule 1 is evaluated. For example, a precondition of Rule 1 can be whether a tank level is more than 50%. A precondition of Rule 2 is evaluated. For example, a precondition of Rule 2 can be whether the tank level is over 100%, i.e., whether the tank is overflowing. Obviously, if the tank level is over 100%, the tank level is necessarily over 50%. Therefore, another precondition of Rule 2 (the "suppressing condition") can be, for example, "No show rule Rule 1 not tested". When Rule 2 becomes true, the suppressing condition, while not participating in the Rule 2 evaluation, will write into the "suppressed by" attribute of Rule 1. For example, an identifier, such as the text "R-2," would be entered indicating that Rule 2 is suppressing Rule 1 and the message associated with the Rule 1 would not be displayed. Note that if another true and non-suppressed Rule X (not shown) leads to the same conclusion as rule 1, the message associated with this rule would still be displayed; for example in the form "text of rule X: message of conclusion 1", or in a more specific example in the form "text of rule X: Unusually high level possibly leading to overfilling of the tank". Conversely, when Rule 2 is not True and Rule 1 is TRUE, Rule 1 is not suppressed and the message of Rule 1 is displayed, for example in the form "text of rule 1: message of conclusion 1", or in a more specific example in the form "Tank level over 50%: Unusually high level possibly leading to overfilling of the tank".

Figure 2B:
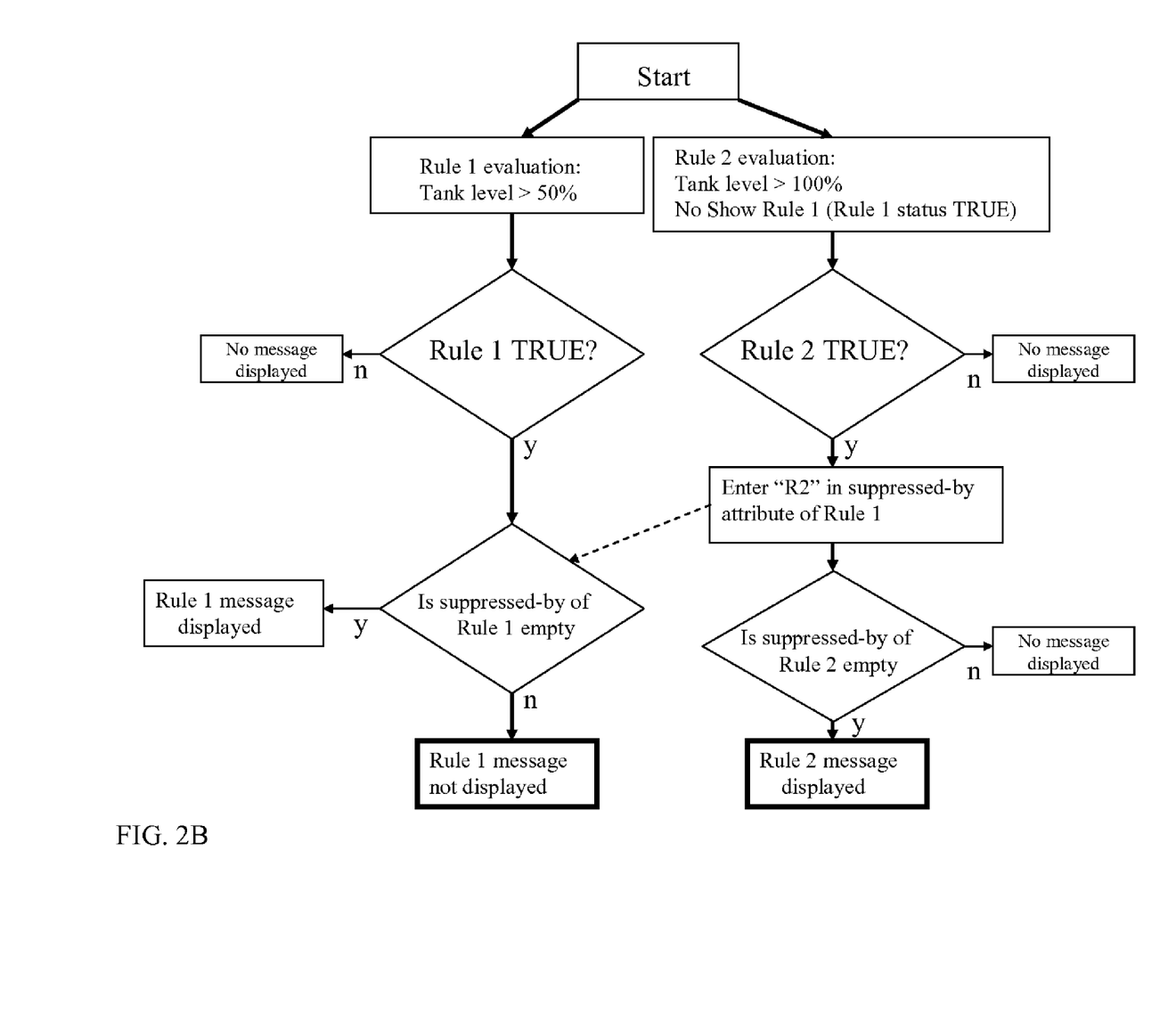
FIG. 2B is a logic flowchart showing an illustrative embodiment of a method for conditional rule suppression.

FIG. 2B is a logic flowchart showing another method for rule suppression according to embodiments herein. Such method is a method for a conditional rule suppression method wherein Rule 2 is to suppress Rule 1. Referring to FIG. 2B, a precondition for Rule 2 is "No show rule Rule 1 TRUE." The difference from the non-conditional rule suppression method of FIG. 2A is that Rule 1 is now required to be TRUE for Rule 2 to become TRUE, and the disabling precondition becomes one of the evaluated preconditions of Rule 2. When Rule 2 becomes true, an identifier, such as the text "R-2," is entered into the "suppressed by" attribute of the Rule 1 indicating that Rule 2 is suppressing Rule 1 and the message associated with Rule 1 would not be displayed. Note that if another true and not suppressed rule leads to the same conclusion as Rule 1, the message associated with this rule would still be displayed.

Figure 2C:
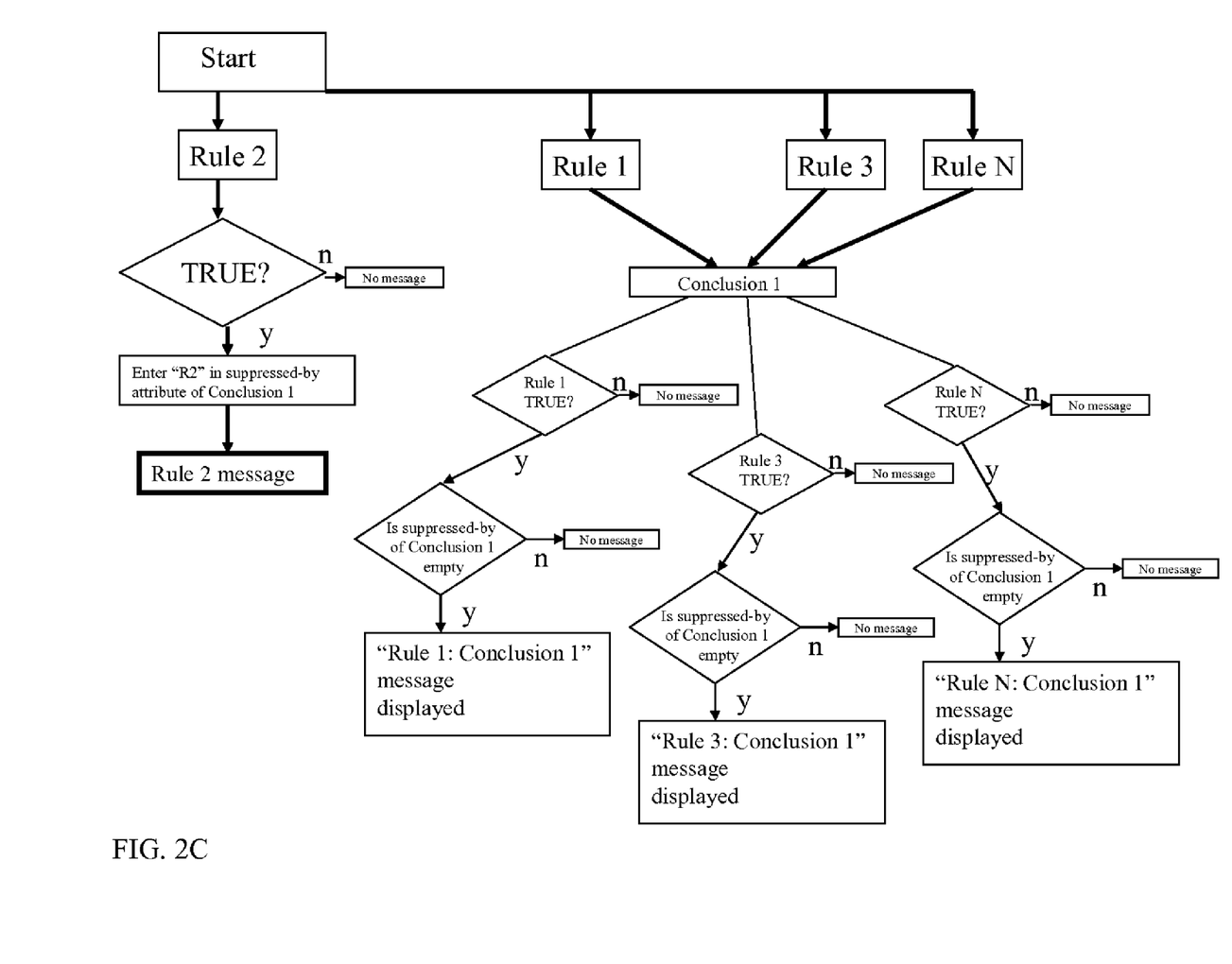
FIG. 2C is a logic flowchart showing an illustrative embodiment of a method for non-conditional conclusion suppression.

FIG. 2C is a logic flowchart showing one method for conclusion suppression according to embodiments herein. Such a method is an example of a non-conditional conclusion suppression method wherein Rule 2 is to suppress Conclusion 1. As shown in FIG. 2C, a precondition of Rule 1 is evaluated. For example, a precondition of Rule 1 can be whether a tank level is more than 50%. A precondition of Rule 2 is evaluated. For example, a precondition of Rule 2 can be whether the tank level is over 100%, i.e., whether the tank is overflowing. Obviously, if the tank level is over 100%, the tank level is necessarily over 50%. Therefore, another precondition of Rule 2 (the "suppressing condition") can be, for example, "No show conclusion Conclusion 1 not tested". When Rule 2 becomes true, the suppressing condition, while not participating in the Rule 2 evaluation, will write into the "suppressed by" attribute of Conclusion 1. For example, an identifier, such as the text "R-2," would be entered indicating that Rule 2 is suppressing Conclusion 1 and the message associated with any of the rules leading to Conclusion 1 would not be displayed. Note that if another true and non-suppressed Rule X (not shown) leads to the same Conclusion 1, the message associated with this rule would also not be displayed. Conversely, when Rule 2 is not True and Conclusion 1 is TRUE, Conclusion 1 is not suppressed and the message(s) of any rules leading to Conclusion 1 is displayed for example in the form "text of rule 1: message of conclusion 1", or in a more specific example in the form "Tank level over 50%: Unusually high level, possibly leading to overfilling of the tank"

Figure 2D:
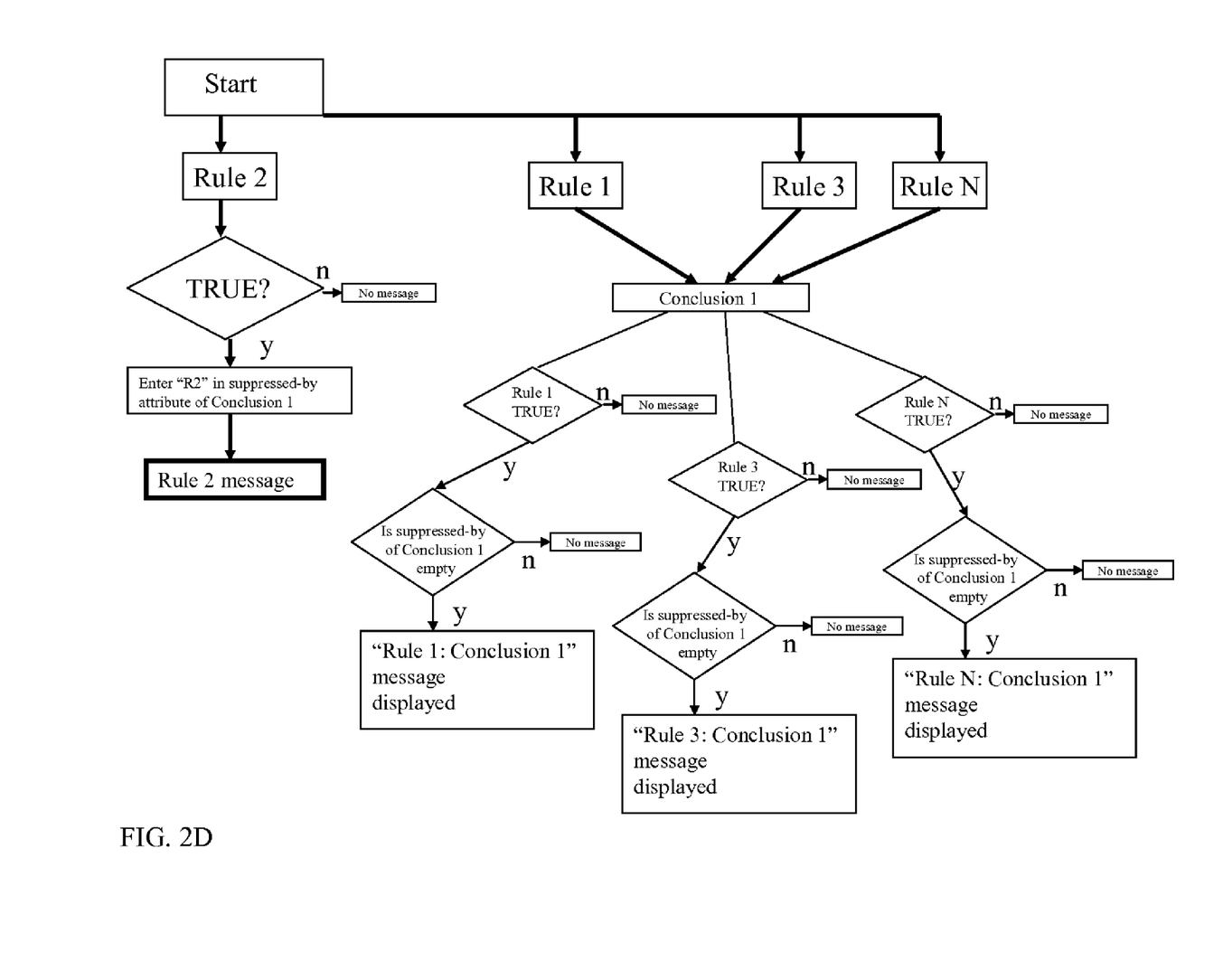
FIG. 2D is a logic flowchart showing an illustrative embodiment of a method for conditional conclusion suppression.

FIG. 2D is a logic flowchart showing another method for conclusion suppression according to embodiments herein. Such method is a method for a conditional conclusion suppression method wherein Rule 2 is to suppress Conclusion 1. Referring to FIG. 2D, a precondition for Rule 2 is "No show conclusion Conclusion 1 TRUE." The difference from the non-conditional rule suppression method of FIG. 2C is that Conclusion 1 is now required to be TRUE for Rule 2 to become TRUE, and the disabling precondition becomes one of the evaluated preconditions of Rule 2. When Rule 2 becomes true, an identifier, such as the text "R-2," is entered into the "suppressed by" attribute of the Conclusion 1 indicating that Rule 2 is suppressing Conclusion 1 and the message associated with any of the rules leading to Conclusion 1 would not be displayed. Note that if another true and not suppressed rule leads to the same conclusion as Rule 1, the message associated with this rule would also not be displayed.

Figure 3:
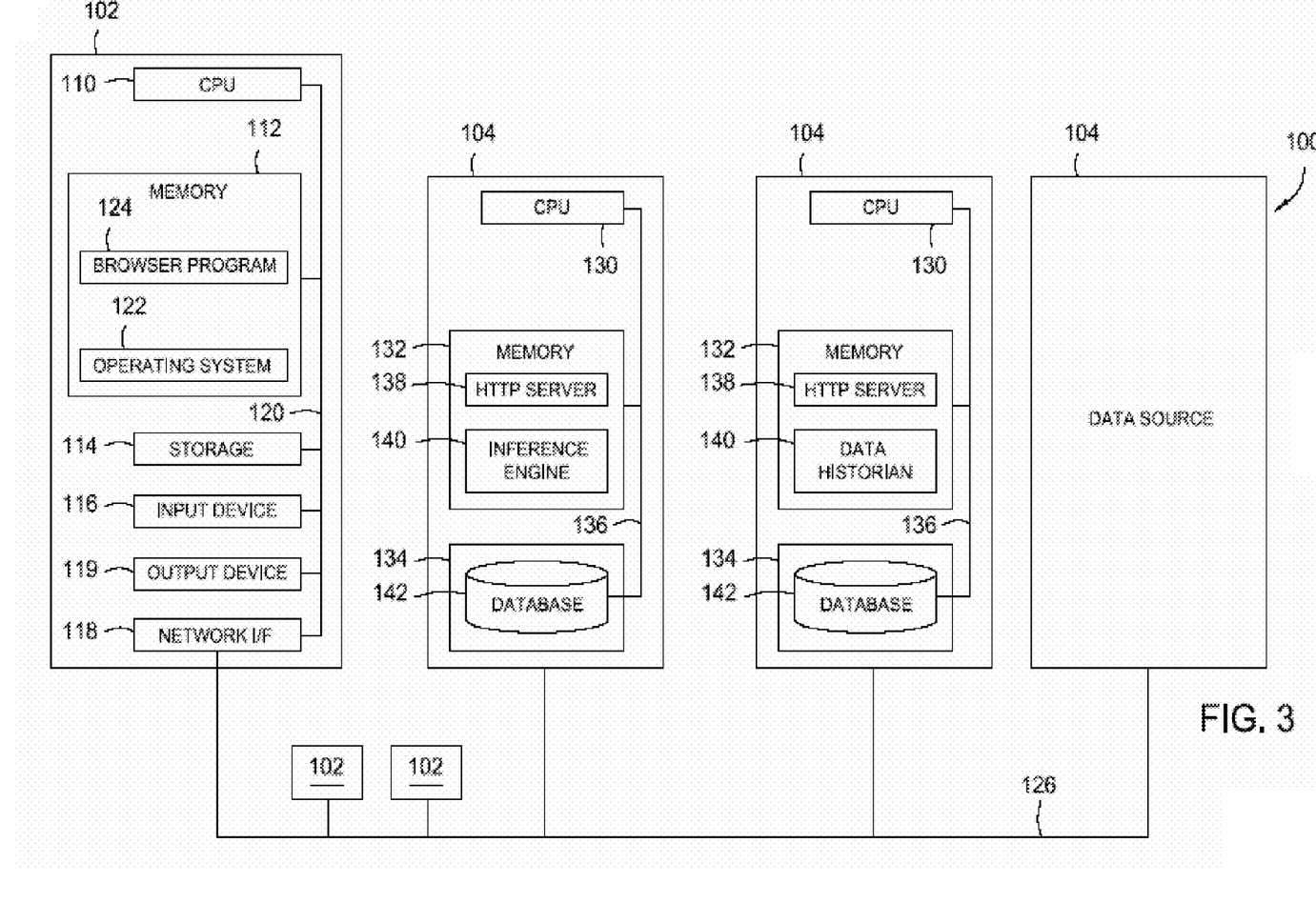
FIG. 3 is a computer system illustratively utilized in accordance with the invention.

FIG. 3 depicts a block diagram of a networked system 100 in which embodiments of the present invention may be implemented. In general, the networked system 100 includes a client (e.g., user's) computer 102 (three such client computers 102 are shown) and at least one server 104 (three such servers 104 are shown). The client computer 102 and the server computer 104 are connected via a network 126. In general, the network 126 may be a local area network (LAN) and/or a wide area network (WAN). In a particular embodiment, the network 126 is the Internet.

The client computer 102 includes a Central Processing Unit (CPU) 110 connected via a bus 120 to a memory 112, storage 114, an input device 116, an output device 119, and a network interface device 118. The input device 116 can be any device to give input to the client computer 102. For example, a keyboard, keypad, light-pen, touch-screen, trackball, or speech recognition unit, audio/video player, and the like could be used. The output device 119 can be any device to give output to the user, e.g., any conventional display screen. Although shown separately from the input device 116, the output device 119 and input device 116 could be combined. For example, a display screen with an integrated touch-screen, a display with an integrated keyboard, or a speech recognition unit combined with a text speech converter could be used. If desired, client computer 102 could be a portable system, such as a laptop or notebook computer.

The network interface device 118 may be any entry/exit device configured to allow network communications between the client computer 102 and the server computers 104 via the network 126. For example, the network interface device 118 may be a network adapter or other network interface card (NIC).

Storage 114 is preferably a Direct Access Storage Device (DASD). Although it is shown as a single unit, it could be a combination of fixed and/or removable storage devices, such as fixed disc drives, floppy disc drives, tape drives, removable memory cards, or optical storage. The memory 112 and storage 114 could be part of one virtual address space spanning multiple primary and secondary storage devices.

The memory 112 is preferably a random access memory sufficiently large to hold the necessary programming and data structures of the invention. While the memory 112 is shown as a single entity, it should be understood that the memory 112 may in fact comprise a plurality of modules, and that the memory 112 may exist at multiple levels, from high speed registers and caches to lower speed but larger DRAM chips.

Illustratively, the memory 112 contains an operating system 122. Illustrative operating systems, which may be used to advantage, include Linux and Microsoft's Windows. More generally, any operating system supporting the functions disclosed herein may be used.

The memory 112 is also shown containing a browser program 124 that, when executed on CPU 110, provides support for navigating between the various servers 104 and locating network addresses at one or more of the servers 104. In one embodiment, the browser program 124 includes a web-based Graphical User Interface (GUI), which allows the user to display Hyper Text Markup Language (HTML) information. More generally, however, the browser program 124 may be any GUI-based program capable of rendering the information transmitted from the server computer 104.

Each server computer 104 may by physically arranged in a manner similar to the client computer 102. Accordingly, each server computer 104 is shown generally comprising a CPU 130, a memory 132, and a storage device 134, coupled to one another by a bus 136. Memory 132 may be a random access memory sufficiently large to hold the necessary programming and data structures that are located on the server computer 104.

As shown, the memory 132 includes a Hypertext Transfer Protocol (http) server process 138 (e.g., a web server) adapted to service requests from the client computer 102. For example, the process 138 may respond to requests to access a data repository 142, which illustratively resides on the server 104. In particular, incoming client requests for data from the data repository 142 invoke an application 140. When executed by the processor 130, the application 140 causes the server computer 104 to perform the steps or elements embodying the various aspects of the invention, including accessing the data repository 142. In one embodiment, the application 140 comprises a plurality of servlets configured to build a graphical user interface (GUI), which is then rendered by the browser program 102. Embodiments of GUIs will be described below.

FIG. 3 is merely one hardware/software configuration for the networked client computer 102 and server computer 104. Embodiments of the present invention can apply to any comparable hardware configuration, regardless of whether the computer systems are complicated, multi-user computing apparatus, single-user workstations, or network appliances that do not have non-volatile storage of their own. Further, it is understood that while reference is made to particular markup languages, including HTML, the invention is not limited to a particular language, standard or version. Accordingly, persons skilled in the art will recognize that the invention is adaptable to other markup languages as well as non-markup languages and that the invention is also adaptable to future changes in a particular markup language as well as to other languages presently unknown. Likewise, the http server process 138 shown in FIG. 3 is merely illustrative and other embodiments adapted to support any known and unknown protocols are contemplated.

Figure 4:
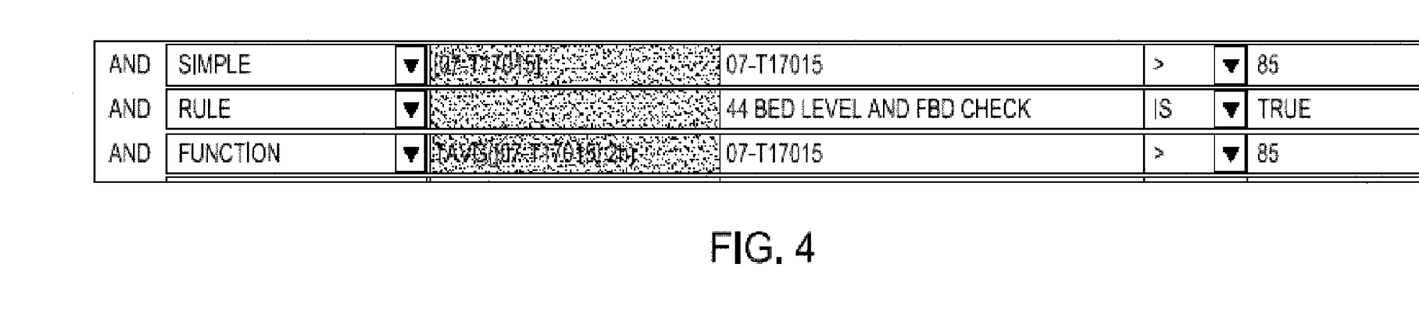
FIG. 4 shows an example of typical preconditions in accordance with one or more embodiments described.
Figure 5:
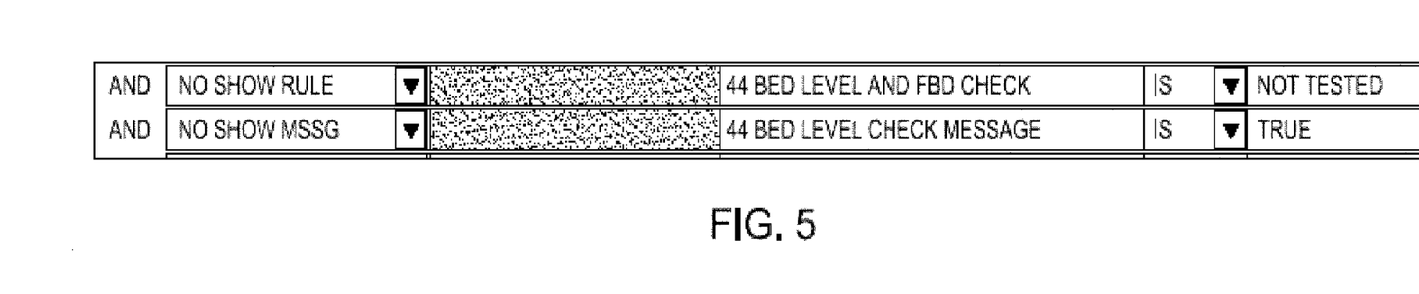
FIG. 5 shows an example of new precondition types in accordance with one or more embodiments described.

Referring now to FIGS. 4-5, a series of graphical user interfaces (GUI) are shown illustrating the user interfaces defined by the application 140. By way of illustration, the graphical user interfaces shown in FIGS. 4-5 are specific to accessing polyolefin production information. However, embodiments of the invention may be used to advantage with any type of information including, for example, any manufacturing or production process, including, for example, continuous, semibatch, or batch manufacturing processes, for chemical processing, refining, semiconductor manufacturing, oil and gas production, oil and gas exploration, financial planning, employment information, discrete parts manufacturing, food processing, computer network monitoring, road traffic management, or any other system which provides data in the form allowing event detection or other message display case by case or in real time.

In general, the graphical user interfaces shown in FIG. 4 show illustrative preconditions which can be included in the premise clause of a rule. In one or more embodiments above or elsewhere herein, a new precondition type "No Show Conclusion" is used to reference the conclusion to be suppressed, and a new precondition type "No Show Rule" is used to reference the rule to be suppressed, as shown in FIG. 5. FIG. 5 shows an example of these new precondition types. Attributes for these new precondition types can be the name of the rule or the conclusion to be suppressed and a parameter showing if this rule or conclusion is tested to be true during precondition evaluation. In other words, values of the attributes can be "TRUE" or "NOT TESTED".

Still referring to FIGS. 1-5, the rules are built programmatically based on the database records. The inference engine establishes a relationship between rule-rule and rule-conclusion pairs participating in suppression. Relations named "suppressed by" and "suppressing" create lists of rules participating in the relation. For example, if several rules have Rule 1 in the "No Show Rule" preconditions, those rules will appear on a list as "rules suppressing Rule 1". On the other hand, if Rule 1 has several "No Show Rule" preconditions (each pointing to different rule) then the list of those rules is a result of the relation "rules suppressed by Rule 1". Programmatic looping through the lists created by these relations is much more efficient then a search through all rules.

In one or more embodiments above or elsewhere herein, where Rule 1 is to suppress Rule 2, when the status of Rule 1 changes and the system inference engine (SIE) identifies Rule 2 in a relation "suppressed by" with Rule 1 and then loops through all other rules in a relation "suppressing" Rule 2 (note that this includes Rule 1). In this loop, whenever a rule with status=TRUE is found, its name is added to the content of the "suppressed by" attribute of Rule 2. Since Rule 1 can be suppressing more than one rule, the process is repeated for all rules in "suppressed by" relation with Rule 1. This ensures correct population of the "suppressed by" attributes of all rules possibly affected by a change of Rule's 1 status. The same process is applied regardless if Rule 1's status changed to TRUE or FALSE, a new content of the "suppressed by" attribute of every rule suppressed by Rule 1 is created after every change in Rule 1's status.

In one or more embodiments above or elsewhere herein, every time Rule 1's status changes and the SIE identifies Conclusion 1 in relation "suppressed by" with Rule 1, the SIE then loops through all other rules in relation "suppressing" Conclusion 1 (note that this includes Rule 1). In this loop, whenever a rule with status=TRUE is found, its name is added to the content of the "suppressed by" attribute of Conclusion 1. Since Rule 1 can be suppressing more than one conclusion, the process is repeated for all conclusions in "suppressed by" relation with Rule 1. This ensures correct population of the "suppressed by" attributes of all conclusions possibly affected by a change of Rule 1's status. The same process is applied regardless if Rule 1's status changed to TRUE or FALSE, a new content of the "suppressed by" attribute of every conclusion suppressed by Rule 1 is created after every change in Rule 1's status. In one or more embodiments above or elsewhere herein, if the "suppressed-by" attribute of a Rule X contains a text string, this text lists all rules suppressing Rule X, allowing full tracing of the suppression method. The same is true for any suppressed conclusion.

To allow message display inhibition by rule and conclusion suppression, a specific message display format is used. Preferably, the message display format is a combination of a rule name and conclusion text, preferably in that order. For example, for a rule named "Reactor 1 BED LEVEL CHECK" and a conclusion text "Reactor Pressure taps used for Level and Weight may be plugging" the message displayed is "Reactor 1 BED LEVEL CHECK: Reactor Pressure taps used for Level and Weight may be plugging". For this "display pair" another rule attribute could be used, such as a rule "ID number" or "Rule Text".

Before a message is displayed, the "suppressed-by" attributes of both the rule and the conclusion are checked and if there is no entry, the message is displayed. If the rule attribute "suppressed-by" has an entry the message would be suppressed by the rule and not displayed. If the conclusion attribute "suppressed-by" has an entry the message would be suppressed by the conclusion.

Instead of the suppressed-by attribute the system can use another attribute for the same purpose. For instance if the "priority" attribute is assigned dynamically as a result of other rules evaluation then its content can be for instance "Priority 1" and 'Priority 2." In this example, objects with Priority 1 can suppress objects with Priority 2. The suppressed-by attribute of a rule or conclusion can be substituted by other methods commonly used in object oriented system, such as an auxiliary object or list or table, which can dynamically designate suppressed rules and conclusions.

Figure 6:
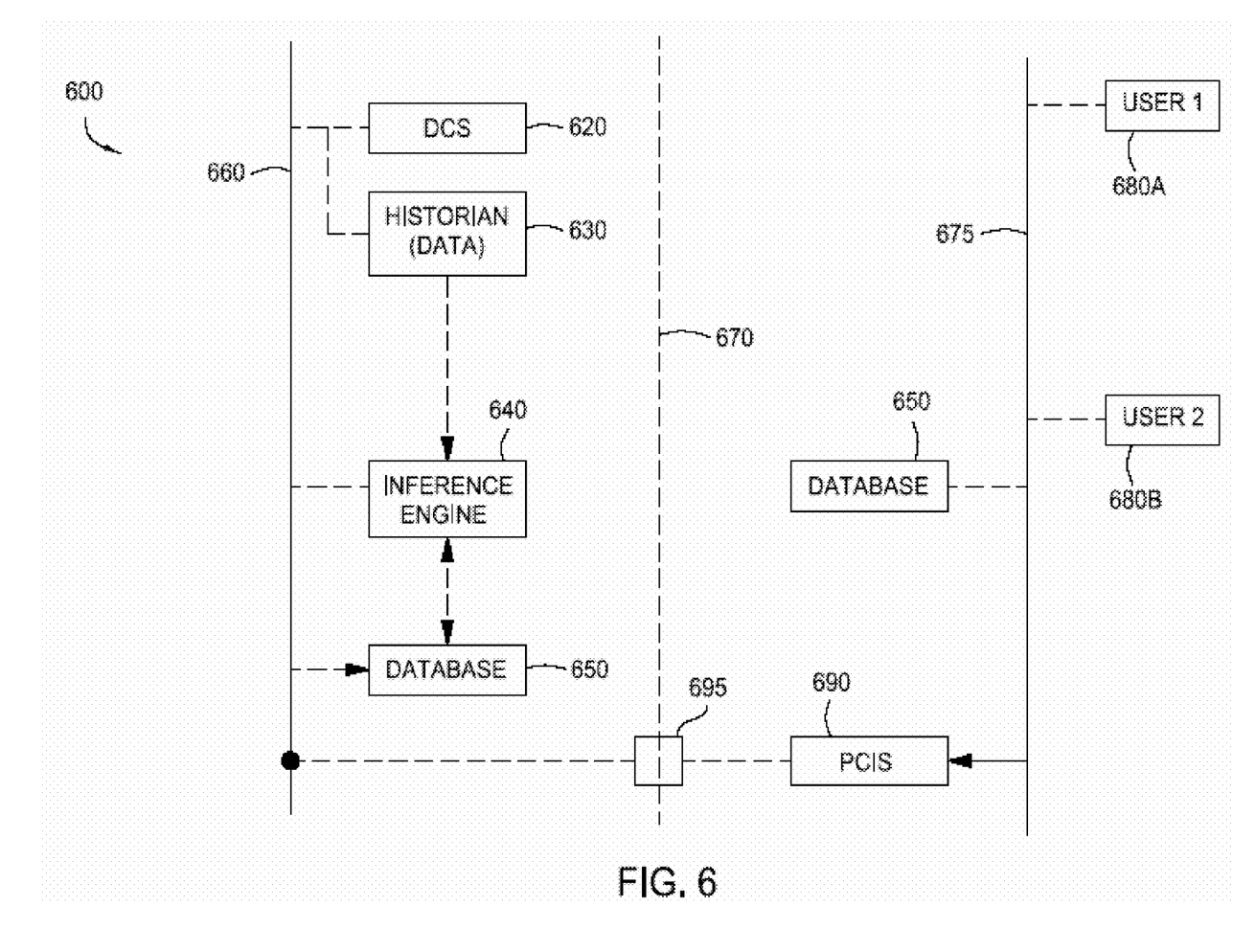
FIG. 6 shows an illustrative block diagram of an expert system in accordance with embodiments of the invention.

In one or more embodiments, an expert system that captures process diagnostic knowledge, helps construct the logic (rules) which reflect the diagnostic methods, evaluates all rules in real time, and displays the resulting messages (advisories) by several convenient methods ranging from printed reports to web pages can be used. Such a system is shown illustratively in FIG. 6. FIG. 6 shows an illustrative block diagram of a rule based expert system 600 with the capability to: display rules which depend on or influence other rules, list rules using a specific variable, and filter rules by related items, equipment or other process units. The expert system 600 includes data source 620; historian 630; inference engine 640; and database 650. The data source 620 can be a distributed control system (DCS), programmable logic controller (PLC), internet data source, or any other data source. Such data sources are well known in the art. Networks 660 and 675 are partitioned by security barrier 670. The barrier 670 between networks 660 and 675 restricts access of the users 680A, 680B. A terminal server 690 can be used to grant and/or regulate access to the network 660 through a firewall router 695.

In one or more embodiments above or elsewhere herein, the knowledge acquisition and creation of diagnostic rules is supported by a versatile user interface such as that shown in FIGS. 4 and 5. The system 600 preferably supports simple IF-THEN logic, functions, historical expressions, nested rules, and/or multiple rules leading to a single message, just to name a few. In one or more embodiments above or elsewhere herein, the system 600 has the capability to attach explanatory text (rationale) to a rule to explain the knowledge and expand the message text. Finally, multiple references can be attached to the rule/conclusion in the form of any document displayable by the computer, including but not limited to live graphs from historian, SOPs, pictures, P&IDs, web links, etc.

In at least one specific embodiment, the system 600 detection function can be done by G2 software from Gensym, Inc. using the system 600 rules. During start-up of the system, the inference engine 640 connects to the database containing all the system 600 information and configures itself The inference engine 640 software then connects to a process data source, such as PI from OSI, Inc. and begins to evaluate the rules. Whenever a rule's state changes, the information is sent to the database 650 for storage. The result is a "real time" database containing all acquired knowledge about event detection methods, the results of the current application, and the history of past events.

The display of the system 600 knowledge can be done by any interface. An illustrative interface is a PI-Process Book from OSI, Inc. for real time display. Microsoft ACCESS can also be used for rule building and printed reports. ACCESS is preferred for general interaction with database. Microsoft Office can also be used. Preferably, the real time display can have a single click drill-down capability from message to rule details to reference document retrieval and data. Thus, the display system effectively delivers the best diagnostic documents available to the user.

Furthermore, the display of system 600 knowledge can be web-based. In one or more embodiments above or elsewhere herein, a web page can be used for a quick view of the active events. In one or more embodiments above or elsewhere herein, a link with e-mail and paging system can deliver messages via mail and pagers.

Figure 7:
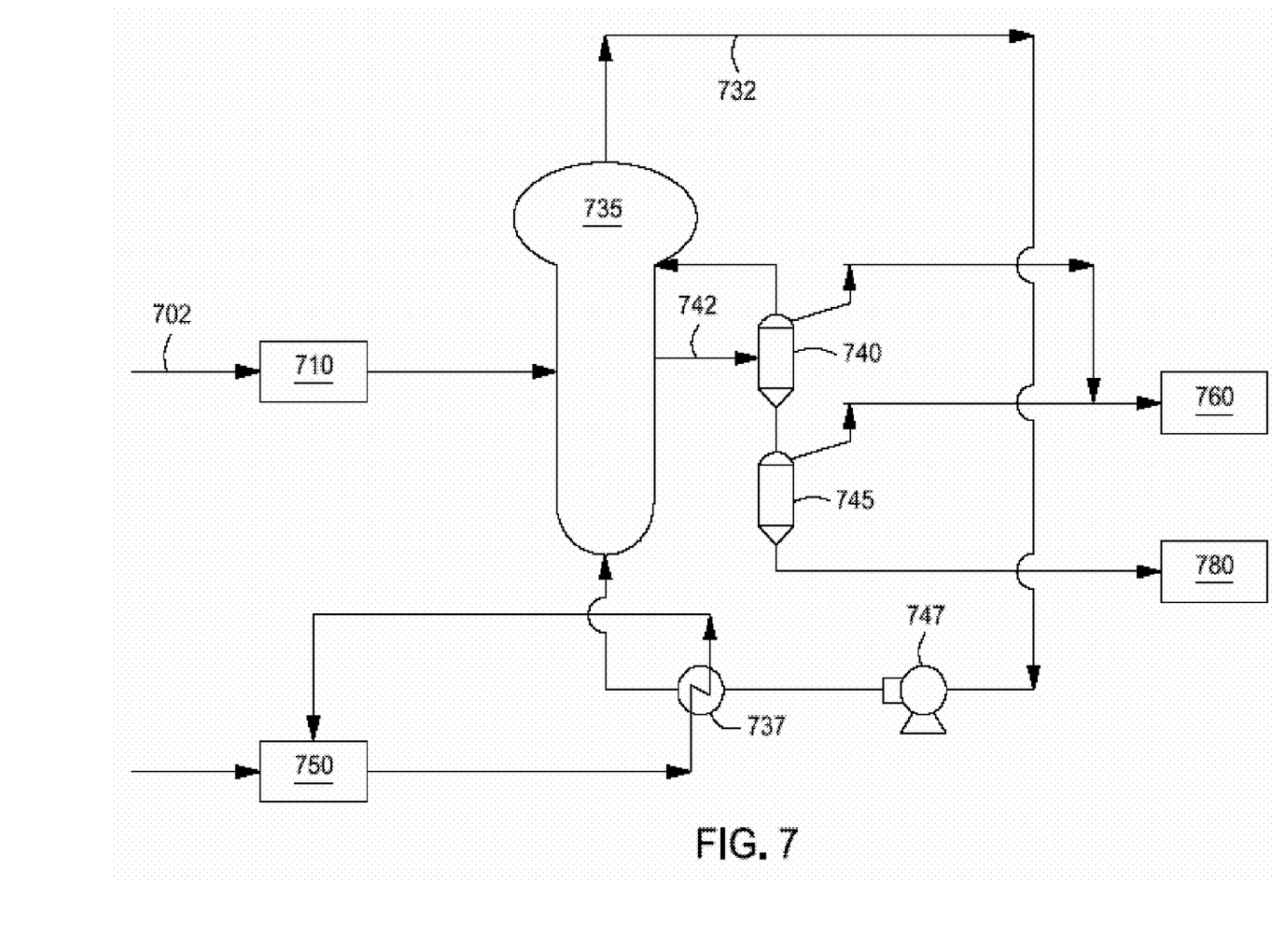
FIG. 7 is a flow diagram of an illustrative gas phase system for producing polyethylene.

FIG. 7 is a flow diagram of an illustrative processing system that can benefit from the message suppression methods described. FIG. 7 shows an illustrative gas phase system for making polyethylene. In one or more embodiments, the system includes a purification system 710, reaction system, cooling tower 750, flare 760 and compounding system 780. The reaction system can include a reactor 735 in fluid communication with one or more discharge tanks 740 (only one shown), surge tanks 745 (only one shown), and recycle compressors 747 (only one shown). The reaction system 730 can also include more than one reactor 735 arranged in series, parallel, or configured independent from the other reactors, each reactor having its own associated tanks 740, 745 and compressors 747 or alternatively, sharing any one or more of the associated tanks 740, 745 and compressors 747. For simplicity and ease of description, embodiments of the invention will be further described in the context of a single reactor train.

The raw material feed streams 702 are preferably purified in the purification system 710 prior to entering the reaction system. The purification system 710 can include one more fixed beds containing catalyst, adsorbents, and/or absorbents to selectively remove impurities from the feed streams. The term "feed stream" as used herein refers to a raw material, either gas phase or liquid phase, used in a polymerization process to produce a polymer product. For example, a feed stream may be any olefin monomer including substituted and unsubstituted alkenes having two to 12 carbon atoms, such as ethylene, propylene, 1-butene, 1-pentene, 4-methyl-1-pentene, 1-hexene, 1-octene, 1-decene, 1-dodecene, styrene, and derivatives thereof. The feed stream also includes non-olefinic gas such as nitrogen and hydrogen.

The feed stream may further include one or more non-reactive alkanes that may be condensable in the polymerization process for removing the heat of reaction. Illustrative non-reactive alkanes include, but are not limited to, propane, butane, isobutane, pentane, isopentane, hexane, isomers thereof and derivatives thereof. In this embodiment, a solvent recovery unit (not shown) recovers the solvent from the recycle line 732, collects the recovered solvent and returns the solvent to the reactor 735.

Referring to the reaction system in more detail, a recycle stream 732 is compressed in a compressor 747 and then passed through a heat exchange zone where heat is removed before it is returned to the bed. The heat exchange zone is typically a heat exchanger 737 which can be of the horizontal or vertical type. If desired, several heat exchangers can be employed to lower the temperature of the cycle gas stream in stages. It is also possible to locate the compressor downstream from the heat exchanger or at an intermediate point between several heat exchangers. Cooling water from the cooling tower 750 can be used to remove the heat from the compressed recycle stream. After cooling, the recycle stream is returned to the reactor 735. The cooled recycle stream absorbs the heat of reaction generated by the polymerization reaction.

Polymer and unreacted monomer is discharged from the reactor 735 to the discharge tank 740 via line 742. The polymer is de-gassed within the discharge tank 740, and further purged with an inert gas such as nitrogen within the surge tank 745 to remove any entrained hydrocarbon gas from the product. The product is then sent to the compounding unit 780 for finishing. The hydrocarbon removed from the polymer discharge is recovered and recycled to the reactor 735 or sent to the flare system 760 for disposal.

Still referring to FIG. 7, certain areas of the gas phase system can be monitored by the expert system 600. Illustrative areas include, but are not limited to the following:
Polymerization system:
  fluidization parameters (bed height, gas velocity)
  temperatures (compressor outlet, reactor inlet)
  quality (PE properties, analyzer function)
Purification:
  ethylene supply pressure
  regeneration due
Discharge system:
  valves travel time
Cooling tower:
  water pressure
Flare:
  BTU requirement
  analyzer function
Compounding:
  Feed surge inventory
  Many quality parameters
  Tempered water flow
  Extruder temperatures
  Gear box temperatures
  Production rates The expert system 600 is extremely valuable in helping formulate and capture diagnostic methods. The formal documentation of the process knowledge is a key asset by retaining information that is usually lost due to, for example, employee mobility or general employee attrition. Furthermore, the display of expert system 600 results (the real-time version) can be used by many people as the first look at unit status. Expert system 600 provides 24/7 evaluation of a process that would be impossible to duplicate on such a scale even by a very experienced person.

More importantly, the expert system 600 avoids adverse situations by monitoring the correct operating window, by production optimization (suggesting operator's response to production rate constraints, quality upset detection, monomer recovery monitoring), by monitoring health of equipment (valve movements, controller correct mode of operation, spare equipment rotation, bed regeneration), and by monitoring main production indicators (production rate, monomer efficiency, process operating windows, manufacturing efficiency index, volatile organic compounds, and other indices depending on local requirements). Another important function of the expert system 600 is the capture of the environmental permitting knowledge, monitoring compliance and correct function of critical devices such as, for example, a flare analyzer.

The present invention is primarily disclosed as a method; however, it will be understood by a person of ordinary skill in the art that an apparatus, such as a conventional data processor, including a CPU, memory, I/O, program storage, a connecting bus, and other appropriate components, could be programmed or otherwise designed to facilitate the practice of the method of the invention. Such a processor would include appropriate program means for executing the method of the invention. Also, an article of manufacture, such as a pre-recorded disk or other similar computer program product, for use with a data processing system, could include a storage medium and program means recorded thereon for directing a data processing system to facilitate the practice of the method of the invention. It will be understood that such apparatus and articles of manufacture also fall within the spirit and scope of the invention.

Certain Specific Embodiments

A. In at least one specific embodiment, a method for message suppression comprises:

provi ding a first rule having one or more preconditions, a suppressed-by attribute, and a conclusion;

providing a second rule having one or more preconditions and a conclusion, wherein at least one of the one or more preconditions is a suppressing precondition;

evaluating the one or more preconditions of the first rule and the second rule;

identifying the first rule as true or false; and displaying the message associated with the second rule if all of the one or more preconditions of the second rule are met.

B. The method of paragraph A, further comprising identifying the second rule in the suppressed by attribute of Rule 1 if all of the one or more preconditions of the second rule are met.

C. The method of any of the paragraphs A through B, wherein evaluating the first rule and the second rule comprises determining whether all of the one or more preconditions are met.

D. The method of any of the paragraphs A through C, wherein the first rule is a suppressed rule if second rule is identified in the suppressed-by attribute of the first rule.

E. The method of any of the paragraphs A through D, wherein the second rule is a non-suppressed rule.

F. The method of any of the paragraphs A through E, wherein the message associated with the suppressed rule is not displayed or is routed to a second display.

G. A method for message suppression, comprising:

providing a first rule having one or more preconditions, a suppressed by attribute, and a conclusion;

providing a second rule having one or more preconditions and a conclusion, wherein at least one of the one or more preconditions is a suppressing precondition;

evaluating the one or more preconditions of the first rule and the second rule; and displaying the message associated with the second rule on a first display if all of the one or more preconditions of the first rule are met and if all of the one or more preconditions of the second rule are met.

H. The method of paragraph G, wherein the one or more preconditions of the second rule are conditioned on the one or more preconditions of the first rule.

I. The method of any of the paragraphs G through H, further comprising identifying the second rule in the suppressed by attribute of Rule 1 if all of the one or more preconditions of the second rule are met.

J. The method of any of the paragraphs G through I, wherein evaluating the first rule and the second rule comprises determining whether all of the one or more preconditions are met.

K. The method of any of the paragraphs G through J, wherein the first rule is a suppressed rule if second rule is identified in the suppressed-by attribute of the first rule.

L. The method of any of the paragraphs G through K, wherein the second rule is a non-suppressed rule.

M. The method of any of the paragraphs G through M, wherein the message associated with the suppressed rule is not displayed or is routed to a second display.

N. A method for message suppression, comprising:

providing at least one suppressed rule having one or more preconditions, a suppressed by attribute, and a conclusion;

providing at least one non-suppressed rule having one or more preconditions and a conclusion;

evaluating the one or more preconditions of the rules to determine a status of the rules as true or false; and displaying the message associated with the non-suppressed rule, if determined true, on a first display without changing the status of the suppressed rule.

O. The method of paragraph N, wherein the one or more preconditions of the non-suppressed rule are conditioned on the one or more preconditions of the suppressed rule.

P. The method of any of the paragraphs N through O, further comprising directing the message associated with the suppressed rule to a second display or record log.

Q. The method of any of the paragraphs N through P, wherein the first display has higher priority than a priority of the second display.

R. The method of any of the paragraphs N through Q, further comprising displaying the message associated with the suppressed rule, if the suppressed rule is determined true and the non-suppressed rule is determined false.

S. The method of any of the paragraphs N through R, further comprising displaying an identification of the non-suppressed rule in the suppressed by attribute of the suppressed rule.

T. A system for operating a production unit, comprising:

a database containing knowledge of the production unit;

a user interface to provide one or more rules each having at least one precondition, a suppressed-by attribute, and a conclusion, and one or more rules each having at least one suppressing precondition and conclusion;

an inference engine to evaluate the one or more preconditions of the rules; and a display to show the suppressing rule and the suppressed-by attribute.

U. In at least one specific embodiment, a method for message suppression comprises:

providing a first rule having one or more preconditions, and a conclusion CCL-1 having a suppressed-by attribute;

providing a second rule having one or more preconditions and a conclusion, wherein at least one of the one or more preconditions is a suppressing precondition;

evaluating the one or more preconditions of the first rule and the second rule;

identifying the first rule as true or false; and displaying the message associated with the second rule if all of the one or more preconditions of the second rule are met.

V. The method of paragraph U, further comprising identifying the second rule in the suppressed by attribute of conclusion CCL-1 if all of the one or more preconditions of the second rule are met.

W. The method of any of the paragraphs U through V, wherein evaluating the first rule and the second rule comprises determining whether all of the one or more preconditions are met.

X. The method of any of the paragraphs U through W, wherein the conclusion CCL-1 is a suppressed conclusion if the second rule is identified in the suppressed-by attribute of the conclusion CCL-1.

Y. The method of any of the paragraphs U through X, wherein the second rule is a non-suppressed rule.

Z. The method of any of the paragraphs U through Y, wherein the message associated with the suppressed conclusion CCL-1 is not displayed or is routed to a second display.

AA. A method for message suppression, comprising:
providing a first rule having one or more preconditions, a suppressed by attribute, and a conclusion;
providing a second rule having one or more preconditions and a conclusion, wherein at least one of the one or more preconditions is a suppressing precondition;
evaluating the one or more preconditions of the first rule and the second rule; and
displaying the message associated with the second rule on a first display if all of the one or more preconditions of the first rule are met and if all of the one or more preconditions of the second rule are met.

BB. The method of paragraph AA, wherein the one or more preconditions of the second rule are conditioned on the one or more preconditions of the first rule.

CC. The method of any of the paragraphs AA through BB, further comprising identifying the second rule in the suppressed by attribute of conclusion CCL-1.

DD. The method of any of the paragraphs AA through CC, wherein evaluating the first rule and the second rule comprises determining whether all of the one or more preconditions are met.

EE. The method of any of the paragraphs AA through DD, wherein the conclusion CCL-1 is a suppressed conclusion.

FF. The method of any of the paragraphs AA through EE, wherein the second rule is a non-suppressed rule.

GG. The method of any of the paragraphs AA through FF, wherein the messages associated with the suppressed conclusion CCL-1 are not displayed or are routed to a second display.

HH. A method for message suppression, comprising:
providing at least one rule having one or more preconditions, and a conclusion CCL-1 having a suppressed by attribute;
providing at least one non-suppressed rule having one or more preconditions and a conclusion;
evaluating the one or more preconditions of the rules to determine a status of the rules as true or false; and
displaying the message associated with the non-suppressed rule, if determined true, on a first display without changing the status of the suppressed conclusion.

II. The method of paragraph HH, wherein the one or more preconditions of the non-suppressed rule are conditioned on the suppressed conclusion.

JJ. The method of any of the paragraphs HH through II, further comprising directing the messages corresponding to the suppressed conclusion to a second display or record log.

KK. The method of any of the paragraphs HH through JJ, wherein the first display has higher priority than a priority of the second display.

LL. The method of any of the paragraphs HH through KK, further comprising displaying the message(s) associated with the suppressed conclusion, if at least one rule having the suppressed conclusion is determined true and the non-suppressed rule is determined false.

MM. The method of any of the paragraphs HH through LL, further comprising displaying an identification of the non-suppressed rule in the suppressed by attribute of the suppressed conclusion.

The foregoing discussion can be further described with reference to the following non-limiting examples.

Comparative Example

A first rule detects a problem such as "the level in the tank is high," which may not require any action and a second rule detects a problem such as "the tank is overflowing," which may necessitate immediate action. If both rules cause a display of a corresponding message, the first rule's conclusion is superfluous or redundant to the second rule's conclusion because, of course, if the tank overflows the tank level is obviously high. If multiple superfluous messages are displayed simultaneously, the output of the system is compromised because the operator can not immediately determine a priority of the many message displays.

One approach to solving the message overload problem uses rule nesting and classification of messages. In the case of rule nesting, the second rule is added as a FALSE precondition of the first rule (i.e., level is high and tank not overflowing), preventing the first rule from sending a displayed message when the second rule becomes TRUE. The disadvantage of such an arrangement is that the first rule is forced to an incorrect FALSE status, when in fact, the first rule is TRUE because the level is high when the tank is overflowing. If some other rule or rules depend from the first rule, that induced error propagates throughout the expert system. In a large expert system, the induced errors can compromise the integrity (i.e., correctness) of the system. In addition, there will always be a brief nuisance period after the second rule evaluates TRUE that both messages exist until the inference engine re-evaluates the first rule.

Note in the previous example that the rule evaluation logic and the rule suppression logic flow naturally in opposite directions. The "small" problem ("the level in the tank is high") is a prerequisite for the "bigger" problem ("the tank is overflowing"), and the latter rule builds on the results of the former by adding additional criteria. The logic flows "forward" from the "small" rule to the "bigger" rule. With suppression, however, the logic flow is reversed, flowing "backward" from the "bigger" rule to the "small" rule. Use of a technique such as rule nesting to handle suppression conflicts with the natural flow of information leading to both the incorrect status of the "small" rule when suppressed and the delay in suppression (nuisance period). The methods described extend the conventional art of message suppression by directly addressing the "backward" logic flow need. The following prophetic example illustrates this logic flow.

Prophetic Example 1

The rules may be as follows, all with status TRUE and named or having this text attribute:
Reactor 1 BED LEVEL CHECK
Reactor 2 BED LEVEL CHECK
Reactor 3 BED LEVEL CHECK
All three rules lead to the same conclusion named CONC 1 with message-text attribute "Reactor Pressure taps used for Level and Weight may be plugging". Without suppression, three messages would be displayed:
"Reactor 1 BED LEVEL CHECK: Reactor Pressure taps used for Level and Weight may be plugging", "Reactor 2 BED LEVEL CHECK: Reactor Pressure taps used for Level and Weight may be plugging", and "Reactor 3 BED LEVEL CHECK: Reactor Pressure taps used for Level and Weight may be plugging".

Rule A can suppress the first rule in the example, named "Reactor 1 BED LEVEL CHECK" (the "A" is the content of the "suppressed-by" attribute of this rule). The first message will be suppressed by the rule but the other two messages will be displayed. Rule B can suppress the conclusion CONC 1 (the "B" is the content of the "suppressed-by" attribute of this conclusion). In this case no messages will be displayed because the rules are suppressed by the conclusion common to all three rules.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

What is claimed is:

1. A method for monitoring a polyethylene polymerization system, comprising:
   (a) providing an expert system comprising a database containing knowledge of the polymerization system and an inference engine, wherein the inference engine comprises:
      (i) a first rule having one or more preconditions, a suppressed-by attribute, and a message; and
      (ii) a second rule having one or more preconditions and a message, wherein at least one of the one or more preconditions is a suppressing precondition;
   (b) receiving data from the polymerization system;
   (c) evaluating the data from the polymerization system against one or more preconditions of the first rule and the second rule;
   (d) identifying the first rule as true or false; and
   (e) displaying the message of the second rule if all of the one or more preconditions of the second rule are met.

2. The method of claim 1, further comprising identifying the second rule in the suppressed by attribute of the first rule.

3. The method of claim 1, wherein the first rule is a suppressed rule.

4. The method of claim 1, wherein the second rule is a non-suppressed rule.

5. The method of claim 1, wherein the first rule message is not displayed or is routed to a second display.

6. A method for monitoring a polyethylene polymerization system, comprising:
   (a) providing an expert system comprising a database containing knowledge of the polymerization system and an inference engine, wherein the inference engine comprises:
      (i) a first rule having one or more preconditions, a suppressed-by attribute, and a message; and
      (ii) a second rule having one or more preconditions and a message, wherein at least one of the one or more preconditions is a suppressing precondition;
   (b) receiving data from the polymerization system;
   (c) evaluating the data from the polymerization system against one or more preconditions of the first rule and the second rule;
   (d) identifying the first rule as true or false; and
   (e) displaying the message of the second rule on a first display if all of the one or more preconditions of the first rule are met and if all of the one or more preconditions of the second rule are met.

7. The method of claim 6, wherein the one or more preconditions of the second rule are conditioned on the one or more preconditions of the first rule.

8. The method of claim 6, further comprising identifying the second rule in the suppressed by attribute of the first rule.

9. The method of claim 6, wherein the first rule is a suppressed rule.

10. The method of claim 6, wherein the second rule is a non-suppressed rule.

11. The method of claim 6, wherein the first rule message is not displayed or is routed to a second display.

12. A method for monitoring a polyethylene polymerization system, comprising:
   (a) providing a database containing knowledge of the polymerization system, wherein the database comprises:
      (i) at least one suppressed rule having one or more preconditions, a suppressed by attribute, and a message; and
      (ii) at least one non-suppressed rule having one or more preconditions and a message;
   (b) receiving data from the polymerization system;
   (c) evaluating data from the polymerization system against the one or more preconditions of the rules to determine a status of the rules as true or false; and
   (d) displaying the message of the non-suppressed rule, if determined true, on a first display without changing the status of the suppressed rule.

13. The method of claim 12, wherein the one or more preconditions of the non-suppressed rule are conditioned on the one or more preconditions of the suppressed rule.

14. The method of claim 12, further comprising directing the message of the suppressed rule to a second display or record log.

15. The method of claim 14, wherein the first display has higher priority than a priority of the second display.

16. The method of claim 12, further comprising displaying the message of the suppressed rule, if the suppressed rule is determined true and the non-suppressed rule is determined false.

17. The method of claim 12, further comprising displaying an identification of the non-suppressed rule in the suppressed by attribute of the suppressed rule.

18. A method for monitoring a polyethylene polymerization system, comprising:
   (a) providing an expert system comprising a database containing knowledge of the polymerization system and an inference engine, wherein the inference engine comprises:
      (i) a first rule having one or more preconditions, and a message having a suppressed-by attribute; and
      (ii) a second rule having one or more preconditions and a message, wherein at least one of the one or more preconditions is a suppressing precondition;
   (b) receiving data from the polymerization system;
   (c) evaluating the data from the polymerization system against one or more preconditions of the first rule and the second rule;

(d) identifying the first rule as true or false; and
(e) displaying the message of the second rule if all of the one or more preconditions of the second rule are met.

19. The method of claim 1, further comprising identifying the second rule in the suppressed by attribute of the message of the first rule.

20. A method for monitoring a polyethylene polymerization system, comprising:
  (a) providing an expert system comprising a database containing knowledge of the polymerization system and an inference engine, wherein the inference engine comprises:
    (i) a first rule having one or more preconditions, and a message having a suppressed-by attribute; and
    (ii) a second rule having one or more preconditions and a message, wherein at least one of the one or more preconditions is a suppressing precondition;
  (b) receiving data from the polymerization system;
  (c) evaluating the data from the polymerization system against one or more preconditions of the first rule and the second rule;
  (d) identifying the first rule as true or false; and
  (e) displaying the message of the second rule on a first display if all of the one or more preconditions of the first rule are met and if all of the one or more preconditions of the second rule are met.

21. The method of claim 20, wherein the one or more preconditions of the second rule are conditioned on the message of the first rule.

22. The method of claim 20, further comprising identifying the second rule in the suppressed by attribute of the message of the first rule.

23. The method of claim 20, wherein the message of the first rule is a suppressed message.

24. The method of claim 20, wherein the second rule is a non-suppressed rule.

25. The method of claim 20, wherein the suppressed message is not displayed or is routed to a second display.

* * * * *